United States Patent
Anttalainen et al.

(10) Patent No.: US 12,405,245 B2
(45) Date of Patent: Sep. 2, 2025

(54) ARRANGEMENT AND METHOD FOR PROVIDING A WAVEFORM FOR DRIVING AN ION MOBILITY DEVICE

(71) Applicant: OLFACTOMICS OY, Tampere (FI)

(72) Inventors: Osmo Anttalainen, Mikkeli (FI); Niku Oksala, Tampere (FI); Antti Roine, Tampere (FI); Anton Kontunen, Tampere (FI); Mikko Koskenranta, Tampere (FI)

(73) Assignee: OLFACTOMICS OY, Tampere (FI)

( * ) Notice: Subject to any disclaimer, the term of this patent is extended or adjusted under 35 U.S.C. 154(b) by 323 days.

(21) Appl. No.: 17/793,559

(22) PCT Filed: Jan. 18, 2021

(86) PCT No.: PCT/FI2021/050025
§ 371 (c)(1),
(2) Date: Jul. 18, 2022

(87) PCT Pub. No.: WO2021/148714
PCT Pub. Date: Jul. 29, 2021

(65) Prior Publication Data
US 2023/0070955 A1     Mar. 9, 2023

Related U.S. Application Data

(60) Provisional application No. 62/964,688, filed on Jan. 23, 2020.

(51) Int. Cl.
*G01N 27/62*     (2021.01)
*G01N 27/624*    (2021.01)

(52) U.S. Cl.
CPC ................... *G01N 27/624* (2013.01)

(58) Field of Classification Search
CPC ................................... G01N 27/624
See application file for complete search history.

(56) References Cited

U.S. PATENT DOCUMENTS 10,347,479 B2     7/2019  Taylor et al.
2024/0177968 A1*  5/2024  Azad ................ H01J 37/32174

FOREIGN PATENT DOCUMENTS

CN     207995051 U    10/2018
CN     109067179 A    12/2018
(Continued)

OTHER PUBLICATIONS

PCT Application No. PCT/FI2021/050025, International Search Report and Written Opinion, 12 pages, Apr. 12, 2021.
(Continued)

*Primary Examiner* — Nicole M Ippolito
(74) *Attorney, Agent, or Firm* — Meunier Carlin & Curfman LLC

(57) ABSTRACT

An arrangement for providing a waveform for driving an ion mobility device. The arrangement comprises at least a plurality of switching circuits, each switching circuit comprising at least two switches operatively coupled to a first voltage source (VH), wherein the plurality of switching circuits is arranged to be coupled in parallel with respect to each other. The arrangement additionally comprises an interleaving circuit configured to receive a time-varying electrical input signal exhibiting an input frequency and based on said input signal, operate the plurality of switching circuits to provide a waveform via the switches, said waveform exhibiting a switching frequency that is essentially equivalent to the input frequency.

13 Claims, 6 Drawing Sheets

(56) References Cited

FOREIGN PATENT DOCUMENTS

| | | |
|---|---|---|
| WO | 2015097507 A1 | 7/2015 |
| WO | 2016173786 A1 | 11/2016 |

OTHER PUBLICATIONS

Finnish Patent Application No. 20205070, Search Report, 2 pages, Sep. 8, 2020.

* cited by examiner

ARRANGEMENT AND METHOD FOR PROVIDING A WAVEFORM FOR DRIVING AN ION MOBILITY DEVICE

CROSS REFERENCE TO RELATED APPLICATIONS

This application is a United States National Phase patent application of International Patent Application Number PCT/FI2021/050025, filed on Jan. 18, 2021, which claims the benefit of priority to U.S. provisional application No. 62/964,688, filed on Jan. 23, 2020, both of which are incorporated by reference herein in their entireties.

TECHNICAL FIELD OF THE INVENTION

The invention is related to ion mobility spectrometry in general. More specifically, the invention is related to providing a waveform for driving an ion mobility device.

BACKGROUND OF THE INVENTION

Differential Mobility Spectrometry (DMS) known commonly also as Field Asymmetric Ion Mobility Spectrometry (FAIMS) is an atmospheric pressure technique to separate ionized gas components based on their nonlinear electrical mobility among neutral gas molecules.

In DMS, ionized gas molecules are transported with neutral gas via a narrow gap, where either one pair or multiple pairs of coaxial or planar electrodes are connected to a high voltage source (separation voltage SV) generating an asymmetrically oscillating electric field with high and low field parts between the electrodes perpendicular with the flow. The time integral of the oscillating electric field is zero and this electric field is superimposed with a small static DC electrical field (often termed compensation voltage CV) to adjust the offset of the field. The ions move back and forth in the oscillating field and their different mobility in high and low electric field determines the net movement between electrodes.

Depending of the net movement, some of the ions collide with electrodes and neutralize whereas some have net movement of about zero in a direction perpendicular to the flow and can pass the electrodes and enter to following measurement electrodes. The static electric field can be used to select the surviving ion types so that only ions with selected characteristics are able to pass the electrodes. The DMS electrodes can be considered as a band pass filter for ion mobility spectrum and the device may be considered an ion filter.

Yet, not all ions with selected characteristics can pass the ion filter because they are too close to the electrodes during oscillation. Due to the oscillation, the ion filter has an effective gap which is narrower than the physical gap determined by the dimensions of the filter. The effective gap defines the maximum possible signal to noise ratio of the system.

The effective gap is determined by the oscillating electrical field and its frequency. The speed v of an ion in the electric field, disregarding diffusion losses, can be given by:

$$v = k_0 E$$

where E is the strength of the electric field and $k_0$ is the ion's mobility coefficient, which is specific to each ion type. In high electric field, the ion mobility becomes dependent on the electric field so that the field-dependent mobility k is:

$$k = k_0\left(1 + \alpha\left(\frac{E}{N}\right)\right).$$

Here, $\alpha\left(\frac{E}{N}\right)$ describes the nonlinear mobility behavior of an ion in high electric field.

In an ideal DMS, the applied asymmetrically oscillating electric field is an electric waveform exhibiting a square pulse with duty cycle less than 50%. The high and low parts of the applied pulse correspond to ion mobilities of $k_H$ and $k_L$. The effective gap of the DMS filter can then be approximated as:

$$D_{eff} = D - k_H E_H t_H - k_L E_L t_L = k_H E_H \frac{1}{f}\sigma - k_L E_L \frac{1}{f}(1-\sigma),$$

where D is the gap height, f is the frequency of the oscillating electric field, and $\sigma$ is the duty cycle. The effective gap determines the maximum transmission of ions via the DMS filter and is increased with increased electric field switching frequency.

The signal-to-noise ratio of a DMS filter is enhanced with higher switching frequency. This is because the movement of ions that is induced by the time-dependent electric field is reduced along with reducing time that the electric field is affecting the ion, such that the effective gap is increased as the switching frequency is increased and the DMS filter will then allow more of the ions with selected characteristics to pass. With low electric field switching frequencies, even some of the ions that should be able to pass the filter (exhibiting the selected characteristics) have enough time between switching to move to the electrodes and neutralize.

An electric field waveform close to ideal can be generated with a high voltage source and fast switching MOSFET-transistors, gate drivers and a switching controller. Driving the ion filter with pulses causes power losses in the transistors, gate drivers, as well as via filter impedance. Calculating the power loss is complicated and depends on MOSFET's parasitic components such as gate capacitances and RDS (on) but more importantly is linearly dependent on the switching frequency, i.e. the frequency of the oscillating electric field that is exhibited by the produced waveform. The power loss in the components requires careful thermal design and is a limiting design factor for high frequency applications.

Yet, it would be beneficial to drive a DMS filter with an electric field having maximal oscillation/switching frequency to ensure high transmission of ions and thus high sensitivity of the instrument. This is a conflicting requirement to high voltage generator design, which prefers lowest possible frequency to minimize power loss and thermal limitations. With existing waveform generators for DMS filters, performance of the filter devices is hindered due to the frequencies used having to be kept at moderate levels to maintain power losses at acceptable levels.

Other alternatives for driving DMS filters include circuits where e.g. a first high-voltage waveform generator can be connected to the first electrode and a second high-voltage waveform generator can be connected to the second electrode, where each waveform generator produces a sinusoidal waveform. Applying suitable sinusoidal waveforms at the electrodes may produce suitable asymmetric electric fields between the electrodes of the DMS device. With these circuits, power losses may be more controllable and may be kept lower than with circuits employing switches, but the produced electric field frequencies are fixed and are dependent on the characteristics of the circuit. Correspondingly, also duty cycle of the asymmetric field is fixed, depending on the frequency/phase parameters of the sinusoidal waves, and cannot be altered.

DMS devices are often used to identify substances and the process usually involves scanning the separation voltage SV and compensation voltage CV at large ranges to find areas where the substance of interest lies, i.e. used voltage areas that will allow the ions of interest to pass the filter electrodes. This process is time-consuming because of limitations arising from e.g. electronics used to perform the scanning of the different voltage areas

SUMMARY OF THE INVENTION

A purpose of the invention is to alleviate at least some of the problems relating to the known prior art. In accordance with one aspect of the present invention, an arrangement is provided for producing a waveform for driving an ion mobility device. The arrangement comprises at least a plurality of switching circuits, each switching circuit comprising at least two switches operatively coupled to a first voltage source, wherein the plurality of switching circuits are arranged to be coupled in parallel with respect to each other. The arrangement additionally comprises an interleaving circuit configured to receive a time-varying electrical input signal exhibiting an input frequency and based on said input signal, operate the plurality of switching circuits to provide a waveform via the switches, said waveform exhibiting a switching frequency that is essentially equivalent to the input frequency.

According to one other aspect, a method for providing a waveform is disclosed.

Having regard to the utility of the present invention, according to an embodiment, the present invention may provide an improved method and arrangement for providing a waveform for driving an ion mobility device, advantageously improving analytical performance of an ion mobility device or associated apparatus. The provided waveform may exhibit a selected switching frequency while at least some of the components of an arrangement may be subjected to frequencies of operation lower than the selected frequency of the waveform, thus leading to reduced power loss in the components or at least dissipation of power through distributed power supply over several components such as switches.

Reduction of power loss may be advantageous for a waveform, which in ideal conditions is a square waveform.

At least some components of an arrangement may be subjected to less wear and tear as they may be operated for less amounts of time or at smaller use frequency or with dissipated power supply, thereby elongating the use life of the components and possibly making an arrangement for producing a waveform more robust.

Through the invention, the frequency exhibited by a waveform that is used to drive a device, such as an ion mobility device, may be higher than the frequencies that are usable in the prior art. In the prior art, in cases where power losses due to high switching frequency of the waveform may have led to high frequencies not being feasible, such high frequencies may be feasible with the present arrangement for ion mobility device use.

Through enabling use of a waveform with high frequency for driving an ion mobility device, the signal to noise ratio of the device may be enhanced. This is because with use of higher frequency waveforms, it may be possible to allow more of the ions with selected characteristics to pass the filter, as with the enabled waveform frequencies, more of the ions with selected characteristics may be enabled to pass the ion filter that could have collided with the electrodes of the ion mobility device with lower waveform frequency (and thus would be left undetected while not being able to pass the filter).

Compared to for example solutions where two sine waves are combined, with a solution according to the present invention, the produced waveform may be essentially selected to have or exhibit any selected frequency and/or any selected duty cycle, while in the prior art solutions these are fixed. The selection of waveform frequency and/or duty cycle or varying thereof may be done through selection of the input frequency and/or duty cycle of the input signal, e.g. PWM signal.

The waveform provided by embodiments of the invention may be asymmetric, which is the type of waveform that is desired in regular use of an ion mobility device. Yet, as will be seen below, also a use case scenario where a non-asymmetric waveform is used may be possible, and the provided waveform of an arrangement according to the invention may thus be asymmetric in some cases while in others not. A waveform generally referred to as "asymmetric" in the following text will not be limiting in the sense that the waveform may also be symmetric in special use cases.

A characteristic of an arrangement according to one embodiment of the invention is that the frequency of a provided asymmetric waveform may be varied while keeping the duty cycle constant. This may be utilized to determine characteristics of ions passed through an associated ion mobility device. Ions may be characterized through varying the separation voltage SV and compensation voltage CV so that the SV is first set to a selected value, while the CV is varied or scanned in a selected range (which selected range may e.g. lie below 1% of the SV). During the scanning, the ion flow that is passed through the ion filter of the ion mobility device may be measured as a function of SV. Thereafter, the CV may be changed to some other constant value and the CV scanning may be repeated. This procedure may be repeated until a desired SV span has been explored (at e.g. selected increments of CV), so that ions may be distinguished by having SV and CV as parameters of intensity of ion flow passing the filter. When a certain intensity peak is known at a specific combination of SV and CV, these may be fixed to these values and switching frequency may then be varied. By altering (e.g. decreasing) the frequency while keeping the duty cycle constant, the ion mobility in the high and low field portions remains unchanged, but the loss of ions in the filter is increased as more ions collide with the electrodes. Observation of these effects could be utilized to determine the mobility of a certain ion and obtain information related to the cross-sectional area of an ion, which is a value characterizing the ion.

The invention may provide also one other way of determining cross-sectional area of an ion, where a duty cycle of 50% may be used for a provided waveform (this being an example of a special use case scenario where the provided waveform is not asymmetric). Here, the intensity of ions passing the filter may be measured, where the resulting function will comprise all ions that are able to pass the filter. The ions which have highest speed will collide with the device electrodes more quickly and this type of ion will thus disappear from the measured intensity signal after not being able to pass the filter, while ions which traverse in the electric field more slowly will appear in the measured signal longer. The change in derivative of the produced function (intensity measurement) may be utilized to indicate the existence of a certain ion type (type of ion which is still able to pass the filter with the selected field).

With the invention, also the duty cycle of the provided waveform may be readily varied. The position of a certain ion in the so-called dispersion matrix SV, CV depends on the different characteristics of the ion in the high and low electric fields. Accordingly, the location of the ion in the SV, CV matrix depends also on the duty cycle. It may be possible that different ions are located at the same position or so close by on the matrix that these may overlap, in which case misinterpretations or false-positive results for some ion may be obtained. In such cases it would be advantageous to change the device parameters and confirm in some other way identity of the ion. Another alternative could be to vary the SV while observing the location of the ion on the CV scale. However, if e.g. the SV is already at a maximum value, increasing SV is not be a feasible alternative. Yet, changing parameters of the ion mobility device may be laborious and time-consuming, whereby with an arrangement of the present invention, the duty cycle can be conveniently varied, for instance to determine identity of ions.

In one embodiment, the switching circuits are half bridge switching circuits. Such switching circuits or components for providing such may be readily produced or commercially available at low costs, making an arrangement simple and/or economical to implement.

The switching circuits are advantageously arranged to be coupled in parallel with respect to each other. Yet, the number of used switching circuits may in some use cases determine the switching frequency of the provided waveform.

Operating of the switching circuits may be based on interleaving logic, which can be implemented through a state machine, the interleaving logic being configured to provide interleaved inputs to the switching circuits based on the input frequency so that each switching circuit is operated by a received interleaved input at an interleaved frequency that is essentially equivalent to or lower than the input frequency.

In advantageous embodiments of the invention, the interleaved operation refers to a case where the switching circuits are operated in alternating manner so that the frequency at which each of the switching circuits is turned on or off (the interleaved frequency) is lower than the input frequency of the PWM signal. Here, each switching circuit may receive an interleaved input one at a time in predetermined order, the switching circuits then being operated at an interleaved frequency that is essentially equal to (or at least substantially corresponding to) half or lower than the input frequency.

In one embodiment, the provided waveform may be coupled to a third electrode of an ion mobility device, with first and second electrodes being disposed above and below the third electrode. A compensation voltage may in this case be coupled to the first and second electrodes. With this coupling to the ion mobility device, disturbances to the components of the ion mobility device caused by the high voltage that is provided by the arrangement via the waveform may be reduced, as the coupling to the third electrode may provide EMC shielding for the waveform. Disturbances due to the high voltage increase with increasing switching frequency, and thus the coupling to a center electrode (third electrode) of an ion mobility device may be useful with the present arrangement, which offers possibilities to use higher switching frequencies than prior art arrangements.

The term "interleaving" in this document may refer to controlling or operating a plurality of switching circuits based on a PWM electrical signal in a manner where the frequency of the PWM signal is used to determine the frequency at which switching circuits are operated, typically the frequency at which one or more of the at least two switches of a switching circuit are turned on or off.

The turning on or turning off of a switch refers herein typically to turning on or off of a switch element, advantageously a transistor, in a switching circuit to allow current to flow though the switch in its on state and have essentially zero current flowing therethrough in its off state.

An ion mobility device refers to a device which comprises at least an ion mobility filter, i.e., comprises at least two planar electrodes or plates (or coaxial electrodes) which are disposed parallel to each other such that a channel through which ions can pass is formed between the electrodes. An ion mobility device may also comprise other constituents, such as one or more electrical components or circuit arrangements or other elements contributing to the operation of the ion mobility device.

An ion mobility apparatus may comprise an arrangement according to embodiments of the invention and an ion mobility device to which the provided waveform is coupled.

"Plurality" refers herein to a quantity of two or more.

"Coupled" generally means in this text that entities are electrically coupled or connected to each other, for instance through electrical wiring. The coupling can be either directly or via one or more elements such as electrical components.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The previously presented considerations concerning the various embodiments of the arrangement may be flexibly applied to the embodiments of the method mutatis mutandis, and vice versa, as being appreciated by a skilled person.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
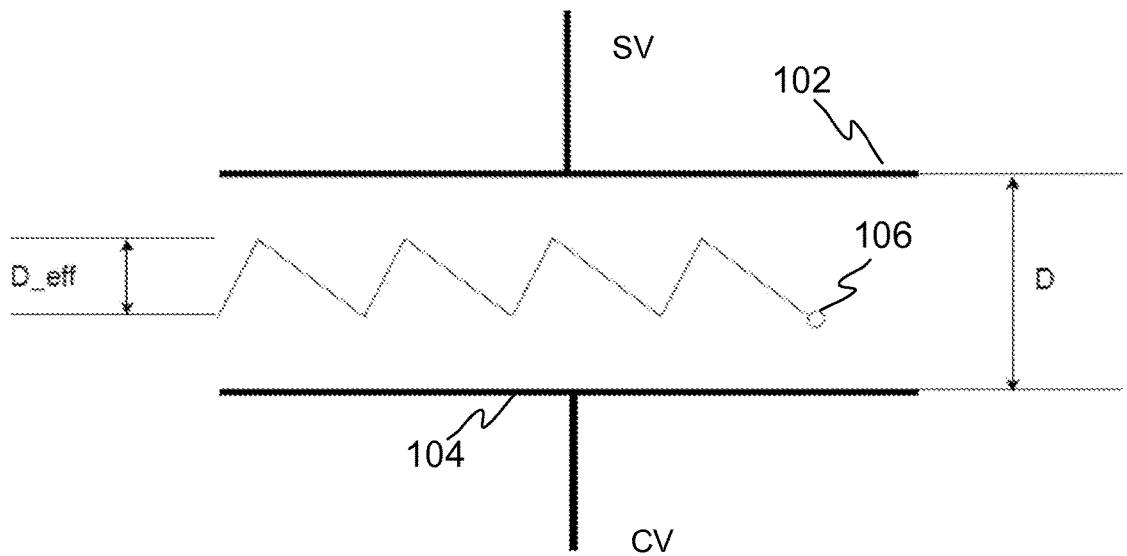
FIG. 1 shows a schematic illustration of a typical ion mobility device and ion trajectory between electrodes of the device.

FIG. 1 illustrates schematically a typical ion mobility device comprising at least a first electrode 102 and a second electrode 104. The electrodes are plate-like and disposed parallel to each other to create a flow channel between the electrodes through which ions comprised in a sample gas flow may traverse. An ion mobility device or at least the first and second electrodes 102, 104 may also be called an ion filter.

The distance D between the first and second electrodes 102, 104 is a physical separation between the two electrodes, while the effective gap $D_{eff}$ illustrates a smaller distance between the electrodes in which the ions are actually able to move, as discussed hereinbefore.

In a typical setup, the first electrode 102 is coupled to the separation voltage (providing the waveform by which the device is to be driven) while the second electrode 104 is coupled to the compensation voltage.

An alternating voltage is applied across the electrodes by driving the ion mobility device with an asymmetric waveform (ideally square wave) giving rise to an alternating electric field (with high and low field parts) between the electrodes. An exemplary trajectory of an ion 106 in this alternating electric field, the ion having selected characteristics in this case (thus likely being able to pass the ion filter of FIG. 1 with the supplied SV and CV) is also shown in FIG. 1. The ion exhibits a sawtooth-like trajectory whilst avoiding collision with the electrodes 102, 104.

Figure 2:
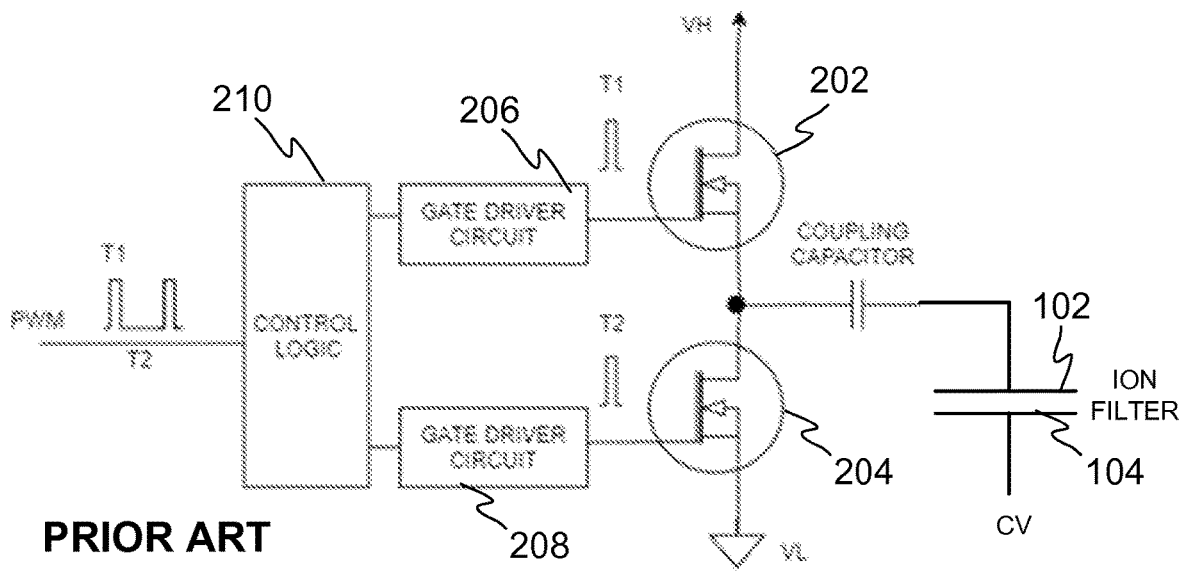
FIG. 2 shows schematically a typical arrangement involving a switching circuit for providing an asymmetric wave-function for an ion mobility device as well as an ion mobility device being coupled thereto.

FIG. 2 shows an arrangement known in the prior art for providing an asymmetric waveform for driving an ion mobility device. The arrangement comprises a first switch 202 and a second switch 204. The switches 202, 204 area typically transistors that are each associated with a corresponding gate driver circuit (GDRV), here a first GDRV 206 and second GDRV 208.

The switches 204, 206 are connected in series between a source of a high DC voltage level (VH) and a source of a low DC voltage level (VL). The switches are turned on and off in an alternating manner, so that both switches 202, 206 are not turned on at the same time.

The switches are controlled (alternately turned on and off) by the GDRVs. The arrangement additionally comprises control logic 210 that is used to control the GDRVs 206, 208 and, consequently the switches 202, 204.

The control logic 210 is adapted to cause turning on and off of the switches 202, 204 based on a received input signal, here a PWM signal. The PWM signal shown in FIG. 2 comprises cycles of high state of time T1 and low state of T2. The control logic 210 is adapted to cause the first transistor 202 to be turned on at times T1 and the second transistor 204 to be turned on at times T2. The result is a waveform with high voltage VH and low voltage VL alternating at the same frequency which is exhibited by the PWM signal.

The produced waveform is coupled to the ion mobility device (ion filter) via a coupling capacitor, which acts as a DC isolator. The coupling may be via the first electrode 102 of the ion filter, while the second electrode 104 is coupled to a compensation voltage CV.

The waveform that is coupled to the ion filter via the coupling capacitor may be termed the separation voltage SV.

With the arrangement of FIG. 2, the frequency with which the switches are controlled is equivalent to the frequency of the received PWM signal. Due to power loss in the circuit/arrangement that increases with increasing frequency, the frequency that may be used for the PWM signal and consequently the frequency of the provided waveform used to drive the ion filter is limited.

Figure 3:
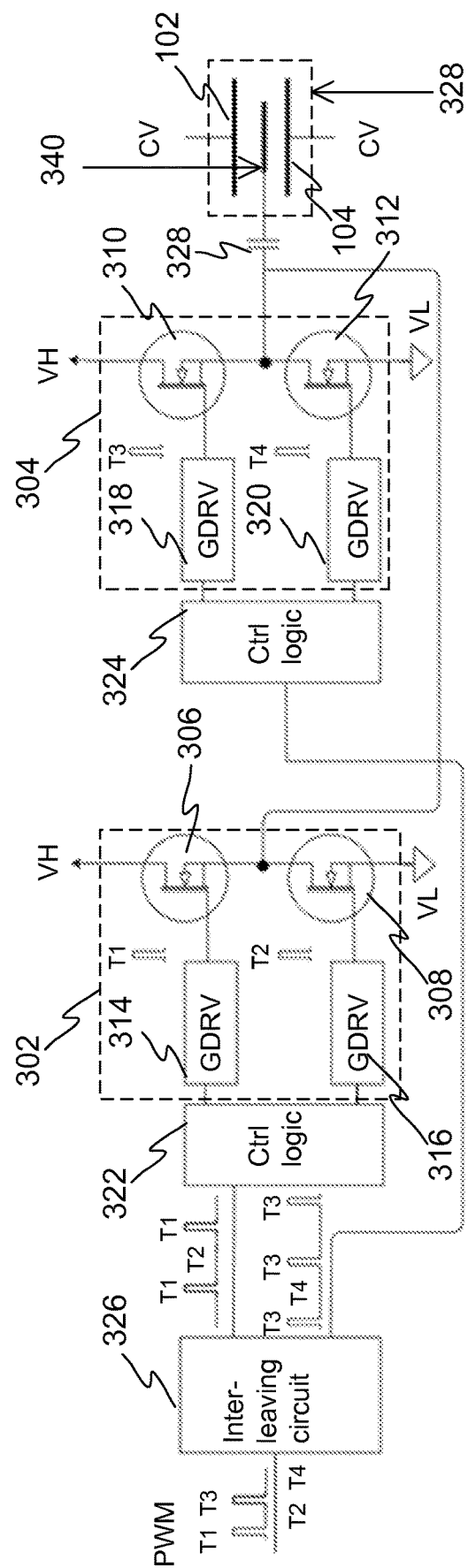
FIG. 3 illustrates schematically an arrangement according to one embodiment of the invention, which is coupled to an ion filter.

FIG. 3 gives a schematic illustration of an arrangement according to one embodiment of the invention which is coupled to an ion filter (ion mobility device). The arrangement comprises a plurality of switching circuits, here a first switching circuit 302 and a second switching circuit 304. Each switching circuit comprises at least two switches, preferably a pair of switches. In the arrangement of FIG. 3 the first switching circuit 302 comprises a first switch 306 and a second switch 308, while the second switching circuit 304 comprises a third switch 310 and a fourth switch 312. The switches may be transistors such as bipolar or FET transistors, e.g. MOSFET transistors.

In some embodiments, one or more of the switching circuits could comprise any number of switches, e.g. three or more. In this case, the arrangement may be able to withstand more voltage stress.

The switches in each switching circuit are coupled between a first, high voltage source and second, low voltage source, essentially similarly to that seen in FIG. 2. For instance, for the first switching circuit 302, the first transistor 306 is coupled to a first voltage source, being a high voltage source VH (producing voltage VH). The first transistor is also coupled (via series connection) to the second transistor 308, which second transistor 308 is in turn also coupled to a second voltage source, being a low voltage source VL (producing voltage VL). VH may in some embodiments be e.g. between 50V and 2500V, preferably between 100V and 2000V, while VL may be e.g. between 0V and −2500V, preferably between 0V and −2000V. The difference in voltage between VH and VL is important and available switches may be usable with about up to 5 kV voltage difference. Typically, variable/adjustable VH and VL could be provided, with VH adjustable between 0V and 1000V and VL adjustable between 0V and −1000V.

In one embodiment, practical operating ranges for VH and VL may be 1000V and −1000V, respectively. VH and VL do not, however, have to be equivalent or correspond to each other.

The difference in voltage ΔV between VH and VL may determine the asymmetric voltage that is produced and applied across the electrodes, where a maximum value of the asymmetric voltage is given by $\Delta V^*(1-\sigma)$ and the minimum value of the asymmetric voltage is given by $\Delta V^*\sigma$ (where σ is the duty cycle). The asymmetric voltage determines the asymmetric/alternating electric field that is produced between the electrodes.

The high voltage source VH may thus be a first voltage source that is configured to provide a first voltage VH and the low voltage source VL may be a second voltage source that is configured to provide a second voltage VL, wherein the first voltage is higher than the second voltage.

The switching circuits of FIG. 3 also comprise gate driver circuits GDRV which are each associated with (and coupled to) one of the switches. For instance, the first switch 306 is associated with a first GDRV 314, the second switch 308 is associated with a second GDRV 316, the third switch 310 is associated with a third GDRV 318, and the fourth switch 312 is associated with a fourth GDRV 320. The GDRVs control the switches and are used to turn the switches on or off.

The different switching circuits 302, 304 may be considered as having half-bridge type structure.

In the embodiment of FIG. 3, the GDRVs are considered to be comprised in the switching circuits 302, 304. In some embodiments, an arrangement could be constructed so that the GDRVs are actually part of or comprised in some other entity comprised in the arrangement. The skilled person will be aware of various ways of implementing the GDRVs.

In the schematic illustration of FIG. 3, each switching circuit 302, 304 is associated with and coupled to control logic, with the first switching circuit 302 being coupled to first control logic 322 and the second switching circuit 304 being coupled to second control logic 324. The control logic may operate and control the switching circuits to turn the switches on and off (via controlling of the GDRVs as in the arrangement of FIG. 3) according to logic based on received inputs.

The control logic may be considered to be a controller entity or component that may be realized as circuitry, and a variety of ways for constructing e.g. half bridge controller (HBC) will be known to the skilled person.

In some embodiments of the invention, the control logic 322, 324 may also comprise the GDRVs 314, 316, 318, 320 and the control logic and GDRVs may either be considered as separate entities or as one entity comprising the necessary logic and/or components to provide the required functionality.

The control logic 322, 324 is adapted to take care of ensuring that the switches 306, 308, 310, 312 are turned on and off according to the received input and such that two switches comprised in the same switching circuit are never turned on at the same time.

The control logic 322, 324 may have two inputs. A first received input may be a signal to switch one of the transistors of the switching circuit on and keep the other off, while a second received input may be an ENABLE/DISABLE signal to suppress the effect of the first input and keep both transistors in an off state.

The control logic 322, 324 may be configured to receive at least one input from an interleaving circuit 326. The interleaving circuit 326 may also be termed interleaving control or interleaving logic or at least may implement interleaving logic that may be adapted to provide inputs to the control logic 322, 324 to control the switches 306, 308, 310, 312 based on input received at the interleaving circuit 326.

The control logic 322, 324 may in some embodiments be comprised in or realized at the interleaving circuit 326. The control logic may be implemented also with a full bridge controller (FBC).

The interleaving circuit 326 may be or comprise a microcontroller, field-programmable gate array (FPGA), or can be built from discrete logic components.

The outputs of the interleaving circuit 326 are used as inputs (control lines) for each switch 306, 308, 310, 312 or alternatively control logic 322, 324 or GDRVs 314, 316, 318, 320 depending on the embodiment, if these are separate entities or not.

The switching circuits 302, 304 are arranged to be coupled in parallel with respect to each other. Depending on the embodiment, also GDRVs and/or control logic 322, 324 if associated exclusively with one switching circuit, may be arranged to reside in parallel with respect to each other, to the extent that they are associated with different switching circuits.

The switching circuits 302, 204 in an arrangement according to the invention may be considered as half bridges that have been multiplied, with only one transistor/switch may being in an on state at a specific time.

The interleaving circuit 326 is configured to receive a time-varying electrical input signal exhibiting an input frequency. Such input may be a PWM signal, either a single PWM or preprocessed PWM with proper timing including the dead time requirements. The PWM signal may be generated by a PWM circuit (not shown), which produces a signal with alternating high state and low state, the alternating states then being provided at the frequency exhibited by the PWM signal, while the times of high state and low state determine the duty cycle of the signal. Specifics of PWM signals and circuits providing such signals with modifiable frequency and/or duty cycle are known in the art.

The interleaving circuit 326 is configured to operate or control the switching circuits 302, 304 based on interleaving logic being configured to provide interleaved inputs to the switching circuits (possibly via control logic 322, 324) based on the input frequency so that each switching circuit 302, 304 is operated by a received interleaved input at an interleaved frequency that is essentially equivalent to or lower than the input frequency.

In the exemplary schematic image of FIG. 3, the interleaving circuit 326 provides an input to the switching circuits 302, 304 such that the switching circuits are operated separately and in isolation at an interleaved frequency that is substantially half of the input frequency.

An input PWM signal may be considered to have repeating cycles of high/on state of time T1, low/off state of T2, high/on state of time T3, low/off state of T4 (with at least times T1 and T3 being equivalent as well as T2 and T4).

The interleaving circuit may be adapted to provide output or signal (e.g. input signal to the first control logic 322) such that the first switching circuit 302 is at least configured to e.g. turn on the first switch 306 at time T1 and turn on the second switch 308 at time T2. The interleaving circuit may then also be adapted to provide output or signal (e.g. input signal to the second control logic 324) such that the second switching circuit 304 is at least configured to e.g. turn on the third switch 310 at time T3 and turn on the fourth switch 312 at time T4.

The outputs of the switching circuits 302, 304 are coupled (preferably via coupling capacitor 328) to an ion mobility device 328 (comprising at least an ion filter).

In this example, a voltage corresponding to VH is supplied to the ion mobility device at times corresponding to T1 and T3, while a voltage corresponding to VL is supplied to the ion mobility device at times corresponding to T2 and T4.

With the outputs from all switching circuits of an arrangement (here both the first switching circuit 302 and the second switching circuit 304) being coupled to the ion mobility device 328, the frequency at which the ion mobility device 328 is driven (switching frequency for the high and low fields) is essentially/substantially equivalent to the input frequency.

Yet, the frequency at which each separate switching circuit is operated at may be smaller than the input frequency when the frequency of the PWM input is divided or split up between the switching circuits. The switches 306, 308, 310, 312 and other components of the switching circuits 302, 304 may cause lower power losses than in prior art arrangements where switching circuits are driven with or operated at the same input frequency.

The reduction of power loss may enable use of higher switching frequency of the provided waveform (which is equivalent to the frequency of the input PWM signal). In advantageous embodiments of the invention, the switching frequency may be e.g. between 100 kHz and 5 MHz, preferably between 1 MHz and 5 MHz.

In an embodiment, having two half bridges with switches 306, 308, 310, 312, the switching sequence for {306, 308, 310, 312} switches is {1,0,0,0},{0,1,0,0},{0,0,1,0},{0,0,0,1},{1,0,0,0} . . . . The sequence can be generated with an FBC, which also takes care of dead time control between the state transfers. Two separate HBC circuits may be used to control the switches 306, 308, 310, 312 and then the interleaving circuit 326 should take care of dead time control. Dead time control is implemented at the GDRVs or at logic level carrying out this functionality and the dead time control is usually carried out at the GDRVs but may also be carried out at the interleaving circuit.

The coupling to the ion mobility device may in some embodiments be essentially equivalent to that of FIG. 2, i.e., the provided waveform or (combined) output from the switching circuits 302, 304 may be coupled to the first electrode 102 of the ion filter of the ion mobility device 328. A compensation voltage CV could then be coupled to the second (opposing) electrode 104.

In one other embodiment, which is depicted in FIG. 3, the coupling of the provided waveform may be arranged through a third electrode 340 comprised in the ion filter of an ion mobility device 328.

An ion mobility device 328, which may be e.g. commercially available, may comprise an ionization area, a filter area, and a collector electrode area. The construction of the device may be such that three circuit boards (or other substrates) may be provided, which are disposed in a substantially stacked configuration with insulation being provided between each circuit board layer to form a flow channel for the sample flow of gas comprising the ions to be analyzed. The middle circuit board (disposed between the other two circuit boards) may be provided with holes so that before and after the filter area the flow channel is of larger dimension and the sample flow passes the middle circuit board from both sides. The middle circuit board may be provided with the third electrode 340 and the provided output from the switching circuits may be coupled thereto. The first electrode 102 may be provided on a circuit board disposed above the middle circuit board, while the second electrode 104 may be provided on a circuit board disposed below the middle circuit board.

The high voltage that is provided by the arrangement via the waveform may be able to cause disturbance in components of the ion mobility device. Coupling of the provided waveform to the third electrode 340 may thus be advantageous, as the provided voltage to the third electrode 340 may remain substantially sheltered/shielded between the first electrode 102 and second electrode 104 which are coupled to a DC compensation voltage CV. Possible disturbances caused by the high voltage may then be avoided or at least reduced.

The above coupling of the provided voltage to the third electrode 340 may also be beneficial in relation to flow resistance. The cross-sectional area of the narrowest region of the flow channel may be increased, which enables a larger flow of sample gas and smaller pressure difference gradient in the filter area.

An ion mobility device 328 utilized in connection with an arrangement according to the present invention may for example comprise a flow channel width of about 1-10 mm for planar electrodes or a radius of inner electrode of about 5-25 mm for coaxial electrodes. The flow channel height may be approximately 0.1-2 mm, while the length of the collector electrodes following the ion filter may be around 1-40 mm. A pressure in the ion filter may be between 0.5 and 1.5 bar, the temperature of neutral gas in the ion filter may be between about −35 and 200° C., while the flow in the flow channel may preferably be in the range of 0.2 to 5 lpm. The ionization may be either radioactive or non-radioactive.

Figure 4:
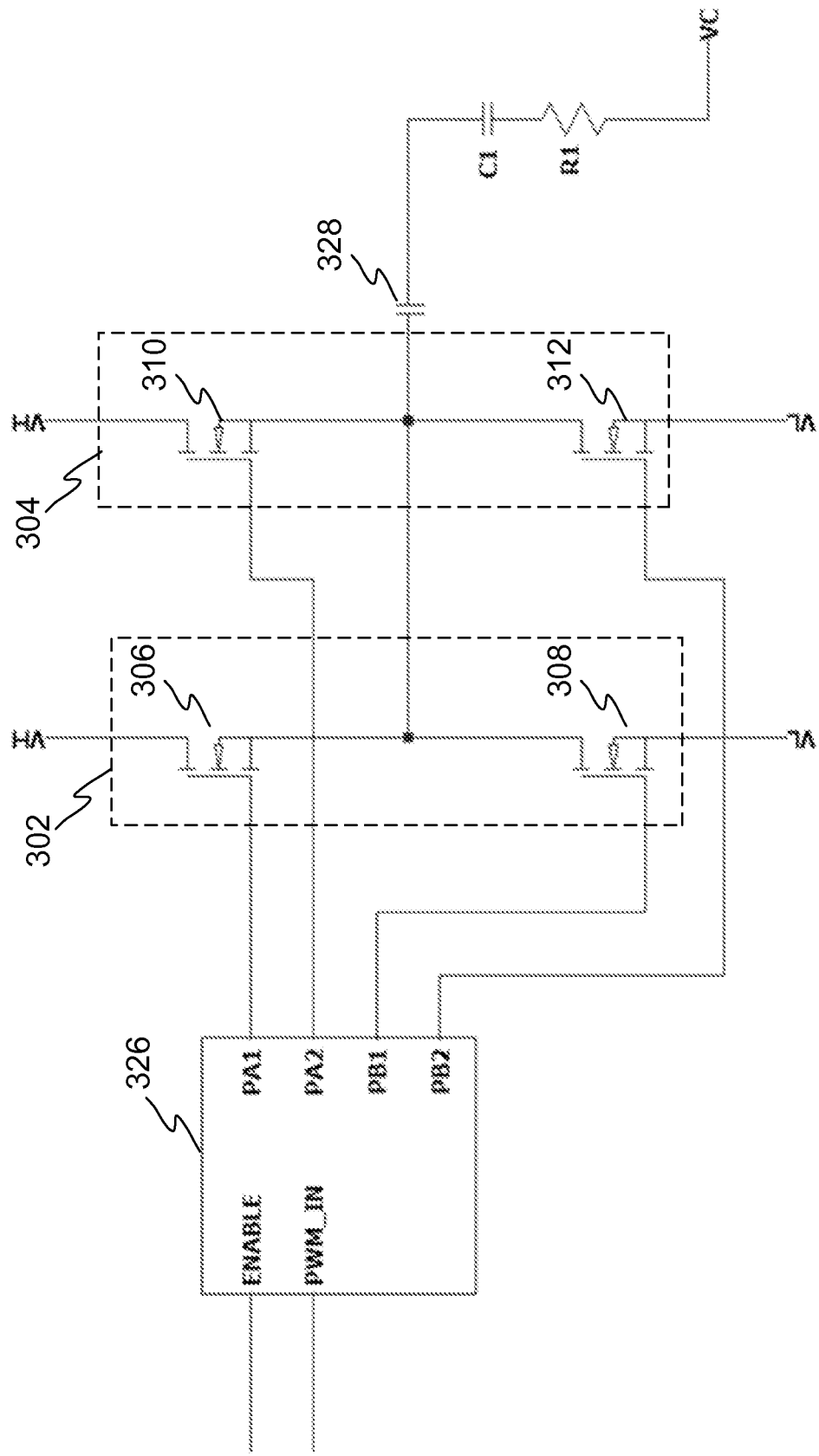
FIG. 4 shows a second schematic illustration of an arrangement according to one embodiment of the invention.

FIG. 4 shows one other schematic illustration of an arrangement according to one embodiment of the invention. The arrangement of FIG. 4 once more comprises a first switching circuit 302 and a second switching circuit 304. It should be noted that an arrangement according to the invention may in other embodiments also comprise more switching circuits 302, 304, such as a third switching circuit, a fourth switching circuit, and a fifth switching circuit etc. The switching circuits also here comprise two switches each, a first switch 306 and second switch 308 comprised in the first switching circuit 302 and a third switch 310 and a fourth switch 312 comprised in the second switching circuit 304. The switch pairs are once again each coupled between a high or first voltage VH and low or second voltage VL.

The arrangement additionally comprises an interleaving circuit 326. In the embodiment of FIG. 4, the interleaving circuit 326 comprises elements to carry out the functionality of the GDRVs 314, 316, 318, 320 and control logic 322, 324 which are illustrated separately in the embodiment of FIG. 3.

In different embodiments of the arrangement, the interleaving circuit 326, GDRVs 314, 316, 318, 320 and control logic 322, 324 may be implemented in different ways, with differing placement of parts of these entities on circuit board(s) and/or within components, and thus these may be considered as either separate entities or may be considered to be part of the interleaving circuit 326. For example, one embodiment could have the components of the interleaving circuit 326 and the GDRVs 314, 316, 318, 320 on one chip, while in one other embodiment, the interleaving circuit 326 could be a separate module, through which the GDRVs 314, 316, 318, 320 are controlled via wiring. The implementation may thus be through separate components or as an integrated solution.

The operation of the arrangement of FIG. 4 is similar to that of FIG. 3, and the interleaving logic may be configured to split the frequency of the PWM signal to the switching circuits so that each switching circuit is operated at an interleaving frequency that is "split" from the input frequency and divided between the switching circuits 302, 304.

The provided output from the switching circuits 302, 304 is combined and provided, via a coupling capacitor 328 to an ion mobility device, which is in FIG. 4 represented as C1. R1 represents the impedance between the compensation voltage CV and the ion mobility device (or at least the filter).

The interleaving circuit 326 may receive as input a PWM signal and also an enable signal. The enable signal may be utilized to enable or disable the functioning of the switching circuits.

The interleaving circuit 326 may, according to interleaving logic and possibly other logic (e.g. conventionally carried out via control logic, HBC, FBC, and/or GDRV), provide output PA1 to the first switch 306, PA2 to the third switch 310, PB1 to the second switch 308, and PB2 to the fourth switch 312.

Figure 5:
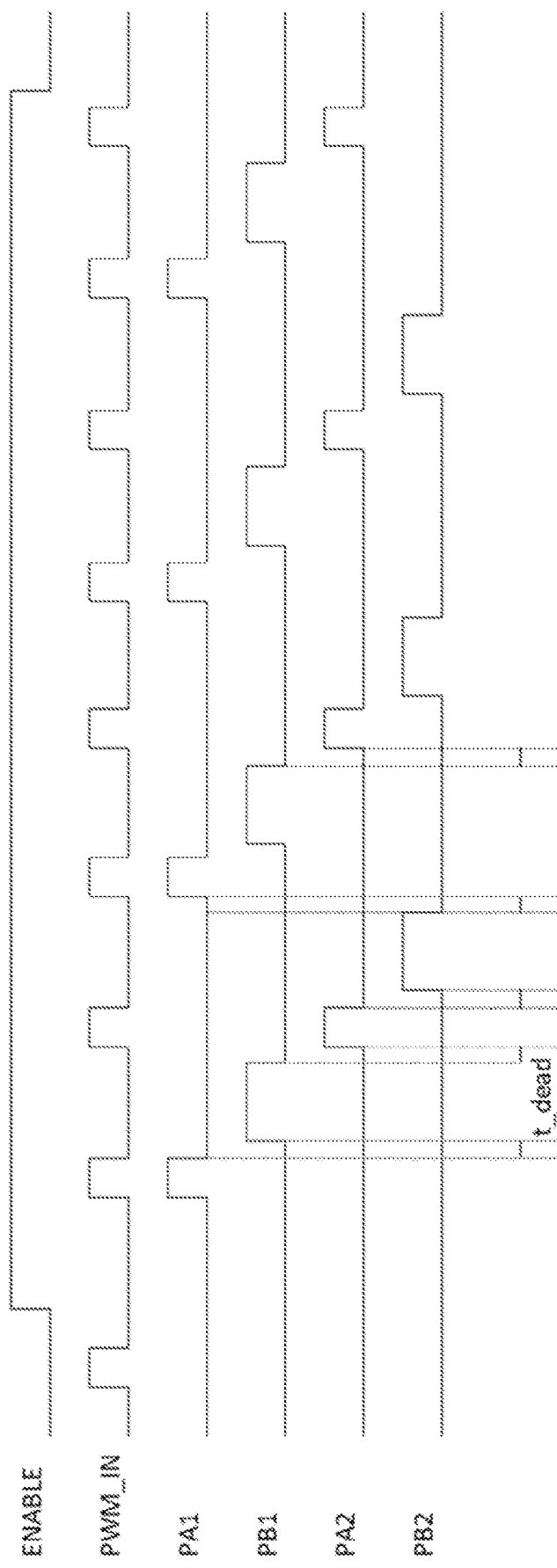
FIG. 5 depicts possible exemplary input signals and output signals of an interleaving circuit for one embodiment of the invention, FIG. 6 gives one more exemplary arrangement according to one embodiment of the invention.

FIG. 5 shows possible exemplary input signals and output signals of an interleaving circuit 326 for one embodiment of the invention, such as the embodiment shown in FIG. 4. The ENABLE and PWM_IN signals may be received as input signals. The output signals PA1, PB1, PA2, PB2 may be received as input signals at switching circuits 302, 304 to operate the switching circuits and cause turning on and off of switches 306, 308, 310, 312 in a manner similar to that described above in relation to FIG. 3.

FIG. 5 also depicts dead times t_dead between signal times in which different switches are to be turned on, where in the dead time all switches will be off to prevent short circuits.

Through embodiments of the invention, the duty cycle of the produced waveform may be variable and can be selected through duty cycle of the input PWM signal (duty cycle of the produced waveform will be essentially equivalent to that of the PWM signal).

The duty cycle used may be about 1-50%, e.g. 1-50%, with most use case scenarios having duty cycle between 5% and 35%. With duty cycles under 50%, the produced waveform is asymmetric, which is desired in conventional ion mobility device use.

However, in some cases also e.g. 50% duty cycle is preferable, such as in a case of determining cross-sectional area of an ion as presented hereinbefore. With the interleaved switching of the present invention, a 50% duty cycle may be advantageous, as the switching frequency may be even higher. For instance, it could be that with a 10% duty cycle and 1 MHz frequency, the ON time of a transistor could be 100 ns. Yet, if the duty cycle of 50% is used with the same frequency, the pulse length could be 200 ns, i.e., 5 MHz.

Figure 6:
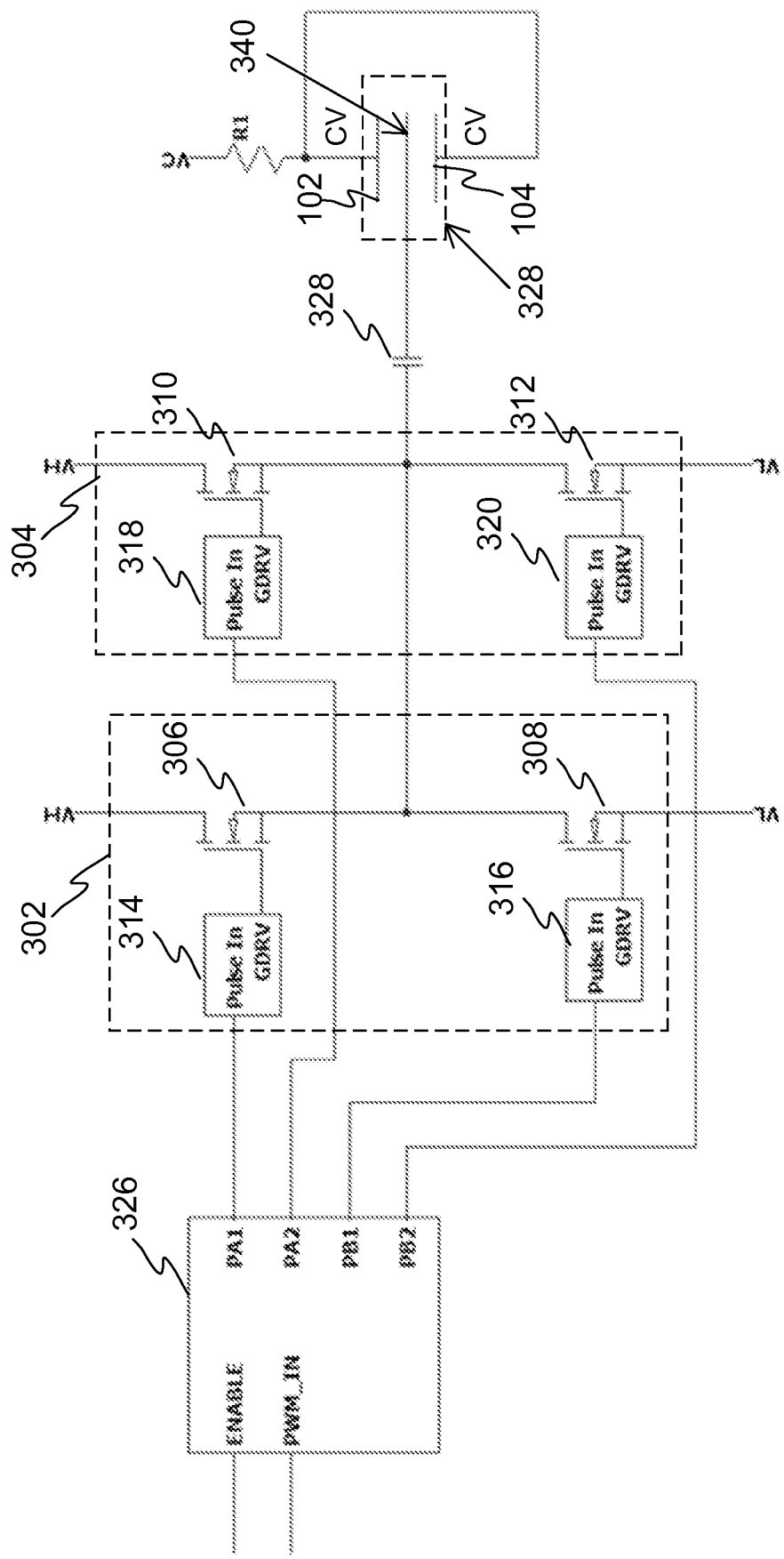

FIG. 6 gives one more exemplary arrangement according to one embodiment of the invention. The embodiment of FIG. 6 is at least in many aspects similar to that of the embodiment of FIG. 4. In FIG. 6, the GDRVs 314, 316, 318, 320 are considered to be and depicted as being comprised in the switching circuits 302, 304. Here, the outputs PA1, PA2, PB1, PB2 of the interleaving circuit 326 are received at the GDRVs, which then operate the switches 306, 308, 310, 312 according to the received signals.

In FIG. 6, the ion filter 328 and associated coupling thereto has been depicted in slightly more detail than in FIG. 4. The produced waveform is coupled to the ion mobility device between the first electrode 102 and the second electrode 104, at the third electrode 340, while the first and second electrodes are coupled to the compensation voltage CV.

Input and output signals of the interleaving circuit 326 of FIG. 6 may in one embodiment be similar to those depicted in FIG. 5. With such a configuration, the switching circuits 302, 304 are operated at an interleaved frequency that is essentially half of the input frequency. Also the individual switches 306, 308, 310, 312 are then operated at a frequency that is half of the frequency at which they would be operated at if the switching circuits 302, 304 were operated so that each would have at least one switch turned on at the same time. As may be comprehended by the skilled person, in cases of similar interleaving logic and possible third and/or fourth etc. switching circuits, the interleaved frequency at which the individual switching circuits are operated at may be less than half of the input frequency. Thus, multiplication of the switching frequency (the frequency of the produced waveform used to drive the ion mobility device) can be done by multiplying the switching circuits and increasing the interleaved outputs at the interleaving circuit 326.

In one other embodiment of the invention, all of the switching circuits, such as e.g. the first and second switching circuit 302, 304 in the case of the embodiment of FIG. 6, are operated at the input frequency by the interleaving circuit. In this embodiment, e.g. the first switch 306 and third switch 310 may be turned on and off at the same time, while the second switch 308 and fourth switch 312 are also turned on and off essentially simultaneously and based on the frequency of the input signal. Such a case for two half-bridges may be described by the sequence {1,0,1,0},{0,1,0,1},{1,0, 1,0} . . . for the switches {303, 308, 310, 312}.

Also in the above described case where the interleaved frequency is substantially equivalent to the input frequency, an arrangement according to the invention may offer advantages over the prior art. The conductive losses and/or resistive loss per transistor during the switching transition may be reduced. This method may be especially suitable for larger loads.

Of course, in embodiments of the arrangement where more than two switching circuits are utilized, it could be possible to distribute the used electrical power over even more components (by simultaneously turning on one switch in each switching circuit) and thus reducing power loss in a single switch even if switches in two or more switching circuits are turned on at once.

In embodiments of the invention, the interleaving logic may be implemented via a state machine. An example of pseudocode is given below for splitting a PWM input signal into two interleaved outputs with VHDL-like state-machine design. The below pseudocode may be implemented in interleaving logic utilized in an interleaving circuit 326 e.g. in embodiments of an arrangement such as those depicted in FIGS. 3, 4, and 6.

```
entity PWM_INTERLEAVER is
  port (
    PWM: in std_logic;
    P1: out std_logic;
    P2: out std_logic
  );
end PWM_INTERLEAVER;
architecture rtl of PWM_INTERLEAVER is
  TYPE State type IS (A, B, C, D, E, F, G, H);
  - PWM: 0 1 0 1 0 1 0 1 INPUT PWM
  - P1: 0 1 0 0 0 1 0 0 Interleaved PWM1
  - P2: 0 0 0 1 0 0 0 1 Interleaved PWM2
  - States: A B C D E F G H
  SIGNAL State: State Type; - Create a signal that uses the different states
```

```
BEGIN
    PROCESS clock, reset)
    BEGIN
        If (reset = '1') THEN - Upon reset, set the state to A
            State <= A;
        ELSIF rising edge (clock) THEN - if there is a rising edge
            CASE State IS
                WHEN A =>
                    IF P='1' THEN
                        State <= B;
                    END IF;
                WHEN B =>
                    IF P='0' THEN
                        State <= C;
                    END IF;
                WHEN C =>
                    IF P='1' THEN
                        State <= D;
                    END IF;
                WHEN D =>
                    IF P='0' THEN
                        State <= E;
                    END IF;
                WHEN E =>
                    IF P='1' THEN
                        State <= F;
                    END IF;
                WHEN F =>
                    IF P='0' THEN
                        State <= G;
                    END IF;
                WHEN G =>
                    IF P='1' THEN
                        State <= H;
                    END IF;
                WHEN G =>
                    IF P='0' THEN
                        State <= A;
                    END IF;
                WHEN others =>
                    State <= A;
            END CASE;
        END IF;
    END PROCESS;
    P1 <= '1' WHEN State=B or State=F ELSE '0';
    P2 <= '1' WHEN State=D or State=H ELSE '0';
END RTL;
```

Figure 7:
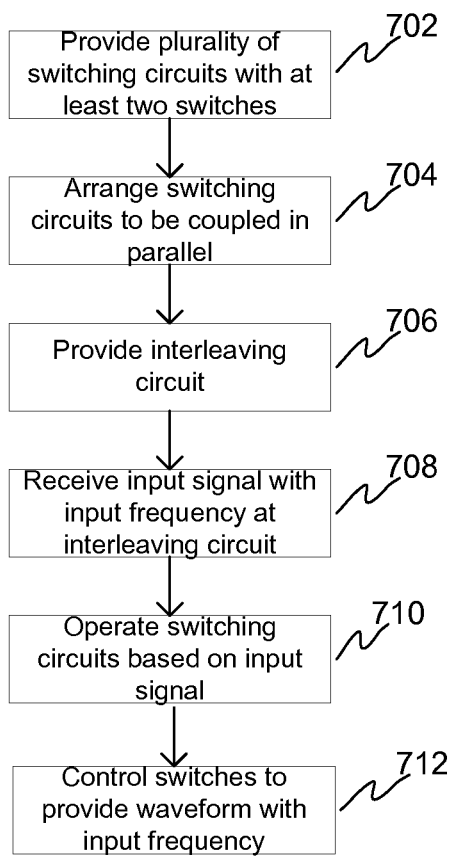
FIG. 7 illustrates a flow chart of a method according to an embodiment of the invention.

FIG. 7 shows a flow chart of a method of providing a waveform according to one embodiment of the invention. At 702, a plurality of switching circuits 302, 304 is provided, wherein each switching circuit comprises at least two switches operatively coupled to a first, high voltage source. The switching circuits 302, 304 are arranged at 704 to be coupled in parallel with respect to each other. An interleaving circuit 326 is provided 706 and a time-varying electrical input signal exhibiting an input frequency is received 708 at the interleaving circuit 326. The plurality of switching circuits 302, 304 are operated 710 based on the input signal via the interleaving circuit 326. Operating of the plurality of switching circuits comprises controlling 712 the switches 306, 308, 310, 312 to provide a waveform exhibiting a frequency that is essentially equivalent to the input frequency.

The provided waveform may be coupled to an ion mobility device 328 to thus provide a waveform for driving the ion mobility device 328.

The invention has been explained above with reference to the aforementioned embodiments and several advantages of the invention have been demonstrated. It is clear that the invention is not only restricted to these embodiments but comprises all possible embodiments within the spirit and scope of inventive thought and the following patent claims.

The features recited in dependent claims are mutually freely combinable unless otherwise explicitly stated.

The invention claimed is:

1. An arrangement for providing a waveform for driving an ion mobility device comprising at least a first electrode and second electrode, where the first and second electrodes are located parallel to each other such that a channel through which ions can pass is formed between the first and second electrodes, the arrangement comprising at least
    a plurality of switching circuits, each switching circuit comprising at least two switches operatively coupled to a first voltage source (VH), wherein the plurality of switching circuits is arranged to be coupled in parallel with respect to each other, and
    an interleaving circuit configured to receive a time-varying electrical input signal exhibiting an input frequency and based on said input signal, operate the plurality of switching circuits to provide a waveform via the switches, said waveform exhibiting a switching frequency that is equivalent to the input frequency, wherein the provided waveform is configured to be coupled to the first electrode of the ion mobility device, or wherein the provided waveform is configured to be coupled to a third electrode of the ion mobility device, which third electrode is disposed between the first and second electrodes of the ion mobility device.

2. The arrangement of claim 1, wherein the switching circuits are half bridge switching circuits.

3. The arrangement of claim 1, wherein each switching circuit comprises a first switch and a second switch that are coupled to each other in series, wherein the first switch is additionally coupled to a first voltage source (VH) and the second switch is additionally coupled to a second voltage source (VL), wherein the voltage provided by the first voltage source is higher than the voltage provided by the second voltage source.

4. The arrangement of claim 1, wherein the switches are transistors.

5. The arrangement of claim 3, wherein the arrangement additionally comprises a gate driver circuit associated with each switch.

6. The arrangement of claim 3, wherein the arrangement additionally comprises control logic associated with each switching circuit.

7. The arrangement of claim 1, wherein the operating of the switching circuits is based on interleaving logic being configured to provide interleaved inputs to the switching circuits based on the input frequency so that each switching circuit is operated by a received interleaved input at an interleaved frequency that is equivalent to or lower than the input frequency.

8. The arrangement of claim 6, wherein each switching circuit receives an interleaved input one at a time in predetermined order, the switching circuits then being operated at an interleaved frequency that is equal to half or lower than the input frequency.

9. The arrangement of claim 6, wherein the interleaving logic is implemented via a state machine.

10. The arrangement of claim 1, wherein the time-varying electrical input signal is a PWM signal.

11. The arrangement of claim 1, wherein the switching frequency is between about 100 kHz and 5 MHz, preferably between about 1 MHz and 5 MHz.

12. An ion mobility apparatus comprising the arrangement of claim 1 and an ion mobility device to which the provided waveform is configured to be coupled to.

13. A method for providing a waveform for driving an ion mobility device comprising at least a first electrode and second electrode, where the first and second electrodes are located parallel to each other such that a channel through which ions can pass is formed between the first and second electrodes, the method comprising at least providing a plurality of switching circuits, each switching circuit comprising at least two switches operatively coupled to a first voltage source (VH), arranging the plurality of switching circuits to be coupled in parallel with respect to each other, providing an interleaving circuit, receiving a time-varying electrical input signal exhibiting an input frequency at the interleaving circuit, operating the plurality of switching circuits based on said input signal via the interleaving circuit, wherein the operating of the plurality of switching circuits comprises controlling the switches to provide a waveform exhibiting a frequency that is equivalent to the input frequency, wherein the provided waveform is configured to be coupled to the first electrode of the ion mobility device, or wherein the provided waveform is configured to be coupled to a third electrode of the ion mobility device, which third electrode is disposed between the first and second electrodes of the ion mobility device.

* * * * *